(12) United States Patent
Lee

(10) Patent No.: US 9,740,332 B1
(45) Date of Patent: Aug. 22, 2017

(54) CHARGING CALIBRATION SYSTEM AND METHOD THEREOF

(71) Applicant: Feeling Technology Corp., Chupei, Hsinchu County (TW)

(72) Inventor: Kun-Hsu Lee, Chupei (TW)

(73) Assignee: FEELING TECHNOLOGY CORP., Hsinchu (TW)

( * ) Notice: Subject to any disclaimer, the term of this patent is extended or adjusted under 35 U.S.C. 154(b) by 0 days.

(21) Appl. No.: 15/585,833

(22) Filed: May 3, 2017

(30) Foreign Application Priority Data

Oct. 6, 2016 (TW) .............................. 105132394 A

(51) Int. Cl.
| | | |
|---|---|---|
| *G06F 3/041* | (2006.01) | |
| *G06F 3/044* | (2006.01) | |
| *G06F 3/0354* | (2013.01) | |
| *G01D 18/00* | (2006.01) | |

(52) U.S. Cl.
CPC ......... *G06F 3/0416* (2013.01); *G01D 18/002* (2013.01); *G06F 3/03547* (2013.01); *G06F 3/044* (2013.01)

(58) Field of Classification Search
CPC ................... G06F 3/044; G06F 3/0418; G06F 2203/04108; G06F 2203/04101; G06F 2203/04106; G06F 1/3265; G06F 3/0412; G06F 3/0416; G01R 35/005; G01R 1/06772; G01R 19/00; G01R 27/2605; G01R 35/00; G01R 27/26; G01R 27/28; G01R 31/318572; G01R 19/25; G01R 27/02

USPC ................................. 345/204, 173, 174, 175
See application file for complete search history.

(56) References Cited

U.S. PATENT DOCUMENTS

| | | | | |
|---|---|---|---|---|
| 8,289,034 | B2* | 10/2012 | Kuang ............... | G01R 27/2605 324/658 |
| 8,688,393 | B2* | 4/2014 | Wu .......................... | G01D 5/24 324/679 |
| 8,941,393 | B2* | 1/2015 | Young ................ | G01R 27/2605 324/679 |
| 2009/0066674 | A1 | 3/2009 | Maharyta et al. | |

FOREIGN PATENT DOCUMENTS

| | | |
|---|---|---|
| TW | I409683 B | 9/2013 |
| TW | M520679 U | 4/2016 |

* cited by examiner

*Primary Examiner* — Duc Dinh
(74) *Attorney, Agent, or Firm* — Muncy, Geissler, Olds & Lowe, P.C.

(57) ABSTRACT

A method of a charging calibration system is mainly to charge/discharge a reference touch pad, then to compute a reference charging time needed for a number of accumulated reference supply duties to reach a reference charging number, then to base on the reference charging time to charge/discharge one of operation touch pads repeatedly by a calibration supply duty, finally to count a number of the experienced calibration supply duties within the reference charging time. Thereupon, a reference charged number of an individual operation touch pad within the reference charging time can be obtained. Thus, the operation touch pad can adjust the reference charging time to meet various environmental requirements. Also, the reference supply duty is greater than the calibration supply duty.

5 Claims, 4 Drawing Sheets

CHARGING CALIBRATION SYSTEM AND METHOD THEREOF

This application claims the benefit of Taiwan Patent Application Serial No. 105132394, filed Oct. 6, 2016, the subject matter of which is incorporated herein by reference.

BACKGROUND OF INVENTION

1. Field of the Invention

The invention relates to a charging calibration system and a method thereof, and more particularly to the charging calibration system and the method of the charging calibration system that can apply a reference touch pad to process calibration.

2. Description of the Prior Art

With rapid progress in modern technology, especially in networking, various advanced electronic devices have upgraded some conventional apparatuses (refrigerators, air conditioners or the like for example) to become much smarter to serve people's life. In particular, these electronic devices are mainly equipped with different types of touch pads. In the art, circuits for these touch pads shall be tested or calibrated in advance, such that these touch-pad circuits can be applied much more smoothly and accurately to the electronic devices.

Practically, while in testing a typical touch pad, the touch pad to be tested is generally treated as a capacitor (except for the foreign capacitor). Thus, in testing, a power supply module is applied to charge/discharge the touch pad. Through the number of charging/discharging, quality of the touch pad can be evaluated. However, in the current art, since the testing is applied to identical touch pads, therefore in the testing under different environments, it is quite possible that a preferable capacitor cannot be derived to achieve an appropriate touch pad to meet the specific environments. Thereupon, in practices, users are difficult to calibrate the touch pad to a state that can meet relevantly the environmental requirement. Under such a circumstance, usage inconvenience of the aforesaid electronic devices is obvious. Thus, improvement upon this application of the touch pads is definitely welcome to the art.

SUMMARY OF THE INVENTION

In view that the current testing method of touch pads cannot calibrate the touch pads to meet environmental changes, accordingly, it is the primary object of the present invention to provide a charging calibration system and a method thereof, that mainly apply firstly a reference touch pad and an operation touch pad, then energize repeatedly the reference touch pad, and finally obtain a corresponding power supply time to calibrate the operation touch pad, such that the operation touch pad can be calibrated according to variations of the reference touch pad caused by environmental changes.

In the present invention, the charging calibration system of a touch pad includes a plurality of operation touch pads, a reference touch pad, a power supply module and a statistics module. These operation touch pads have a first capacitance value. The reference touch pad has a second capacitance value greater than the first capacitance value. The power supply module, electrically coupled with these operation touch pads and the reference touch pad, is to, in a reference measurement mode, apply a reference supply duty including a reference supply stage and a reference supply-terminated stage to repeatedly energize the reference touch pad so as to charge from an initial voltage value to a set voltage value in the reference supply stage, and then further to discharge from the set voltage value back to the initial voltage value in the reference supply-terminated stage; and, further to, in a calibration mode, apply a calibration supply duty including a calibration supply stage and a calibration supply-terminated stage to repeatedly energize one of the operation touch pads so as to charge the instant operation touch pad from the initial voltage value to the set voltage value in the calibration supply stage, and then further to discharge from the set voltage value back to the initial voltage value in the calibration supply-terminated stage. The statistics module, electrically coupled with the power supply module, has a reference charging number. In a reference measurement mode, when an accumulated number of the reference supply duty reaches the reference charging number, the statistics module computes the reference charging time.

In the present invention, the reference supply duty is greater than the calibration supply duty, and, in the calibration mode, the statistics module counts a number of the experienced calibration supply duty within the reference charging time so as to have the counted number as the reference charged number for the instant operation touch pad in the reference charging time.

In one embodiment of the present invention, the statistics module includes a counter, a timer and a register. The counter, having the reference charging number, is electrically coupled with the power supply module, and is to issue a reference counting signal when the accumulated number of the reference supply duty reaches the reference charging number in the reference measurement mode. The timer, electrically coupled with the counter, is to calculate the reference charging time upon receiving the reference counting signal, and to transmit a clock signal standing for the reference charging time. The register, electrically coupled with the timer, is to receive the clock signal so as to store the reference charging time. In the calibration mode, the timer reads the reference charging time, and the counter is triggered to count the number of the experienced calibration supply duty within the reference charging time so as to have the counted number as the reference charged number.

In one embodiment of the present invention, the timer is consisted of a plurality of T-flip flops, and the register is consisted of a plurality of D-flip flops.

In another aspect of the present invention, a charging calibration method of a touch pad, applicable to the aforesaid charging calibration system of a touch pad, includes the steps of: (a) in the reference measurement mode, applying the reference supply duty to repeatedly energize the reference touch pad so as to charge from the initial voltage value to the set voltage value in the reference supply stage, and then further to discharge from the set voltage value back to the initial voltage value in the reference supply-terminated stage; (b) in the reference measurement mode, when the accumulated number of the reference supply duty reaches the reference charging number, computing the reference charging time; (c) in the calibration mode, applying the calibration supply duty to repeatedly energize one of the operation touch pads so as to charge the instant operation touch pad from the initial voltage value to the set voltage value in the calibration supply stage, and then further to discharge from the set voltage value back to the initial voltage value in the calibration supply-terminated stage; and, (d) counting the number of the experienced calibration supply duty within the reference charging time, so as to have the counted number as the reference charged number for the instant operation touch pad in the reference charging time. In the present invention, the reference supply duty is greater than the calibration supply duty.

By adopting the charging calibration system and the method thereof in accordance with the present invention, since the reference charging time is obtained by applying the reference charging number to energize the reference touch pad in the reference measurement mode, and then the number of the operation touch pads can be related to the reference charging time. Hence, under different environments, sensitivity of the operation touch pad can be adjusted directly by varying the capacitance value of the reference touch pad.

All these objects are achieved by the charging calibration system and the method thereof described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a charging calibration system and a method thereof. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
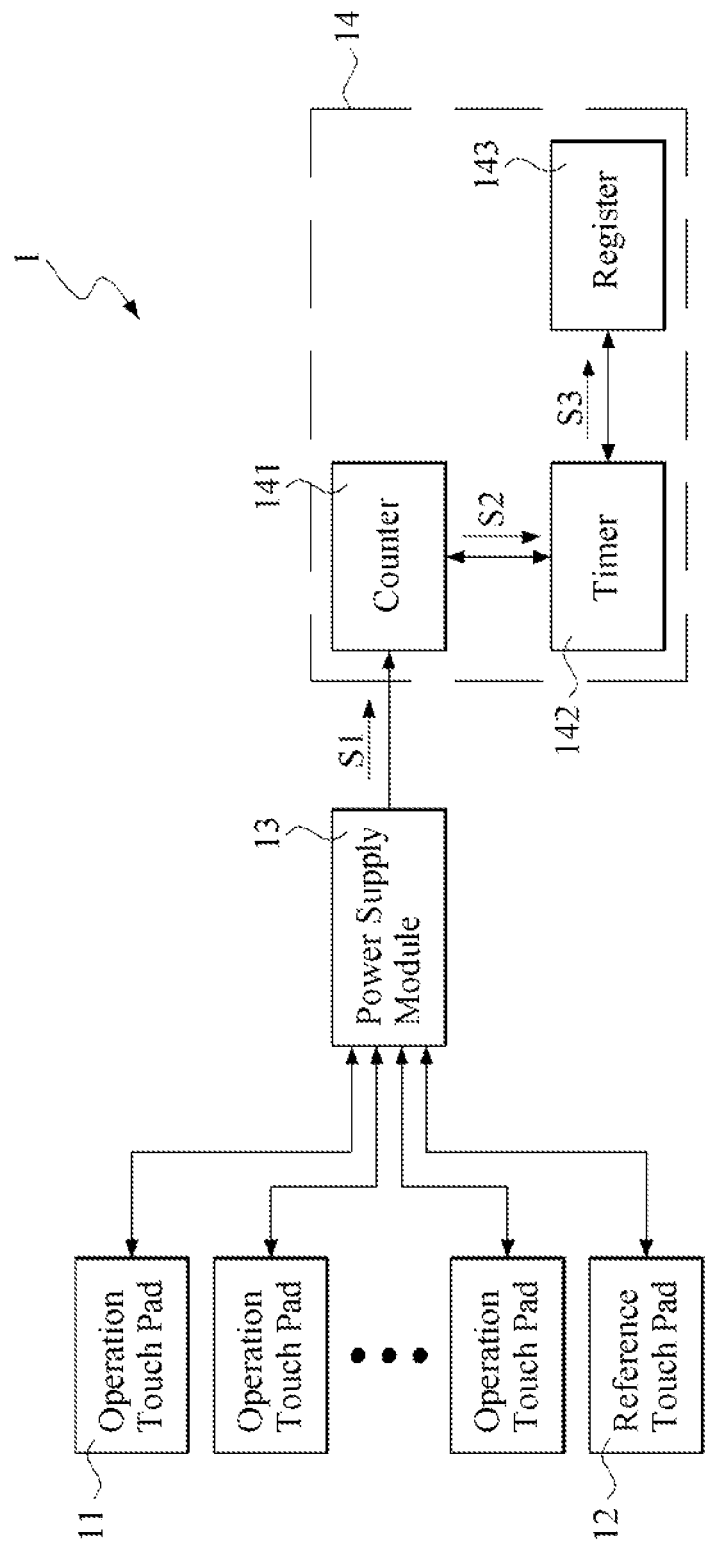
FIG. 1 is a schematic block view of a preferred charging calibration system of a touch pad in accordance with the present invention.
Figure 2:
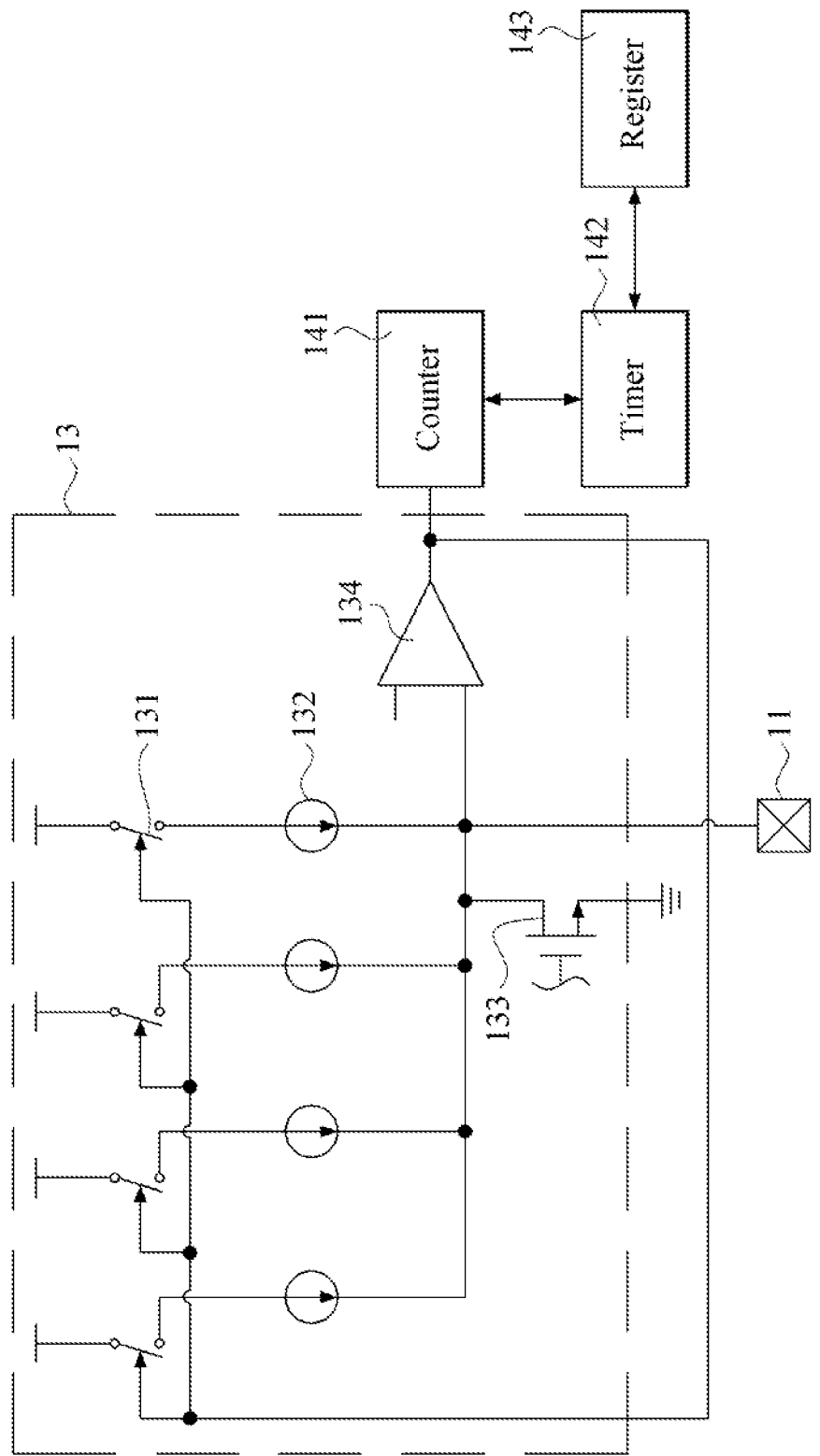
FIG. 2 is a schematic view of a preferred power supply module and and a preferred statistics module in accordance with the present invention.
Figure 3:
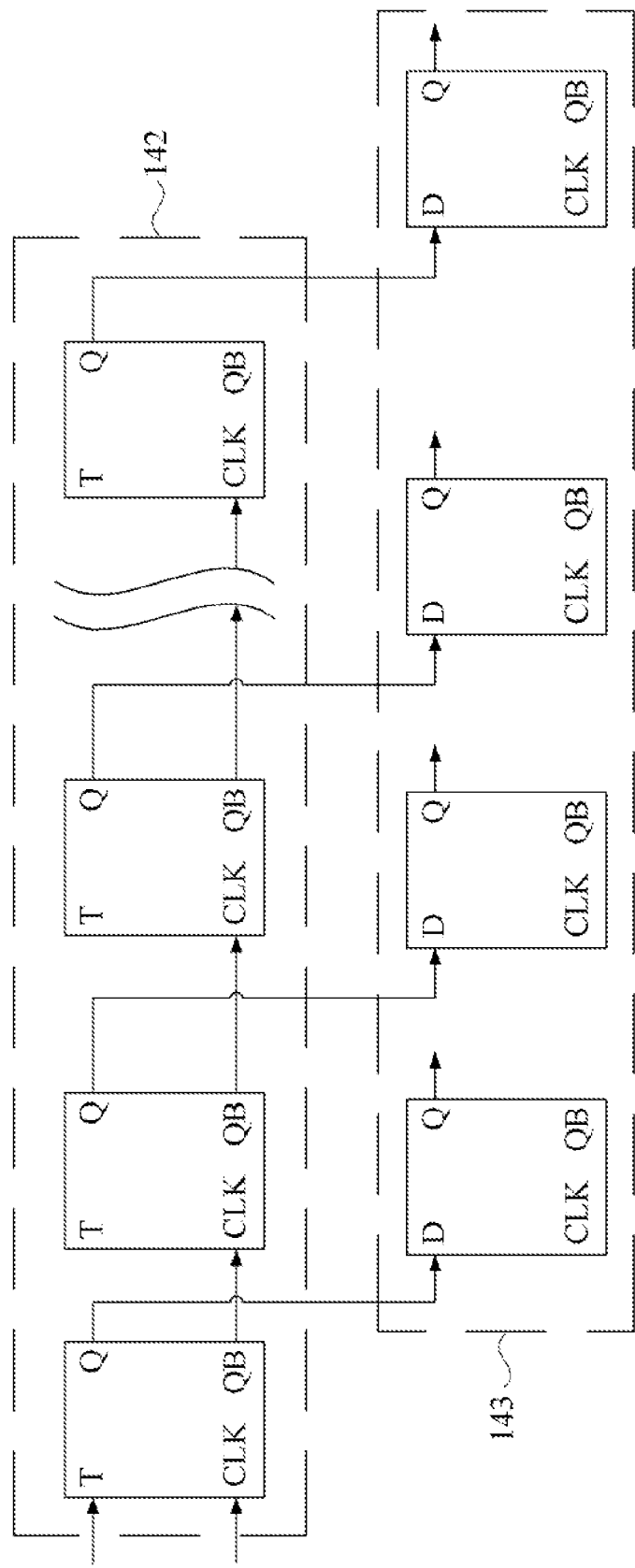
FIG. 3 is a schematic view of a preferred timer and a preferred register in accordance with the present invention.

Refer now to FIG. 1, FIG. 2 and FIG. 3; where FIG. 1 is a schematic block view of a preferred charging calibration system of a touch pad in accordance with the present invention, FIG. 2 is a schematic view of a preferred power supply module and and a preferred statistics module in accordance with the present invention, and FIG. 3 is a schematic view of a preferred timer and a preferred register in accordance with the present invention.

As shown, the preferred embodiment of the charging calibration system of a touch pad 1 includes a plurality of operation touch pads 11, a reference touch pad 12, a power supply module 13 and a statistics module 14. The operation touch pad 11 herein is a touch pad for a user to perform thereon the touching operation. Generally speaking, the operation touch pad 11 has a first capacitor.

On the other hand, the reference touch pad 12 has a second capacitor, and the second capacitor has a second capacitance greater than a first capacitance of the first capacitor. Generally, the second capacitance is N times of the first capacitance, in which the N is a number larger than 1. However, the specific number is determined according to practical requirements.

The power supply module 13 is electrically coupled with the plurality of operation touch pads 11 and the reference touch pad 12. Also, the power supply module 13, a relaxation oscillator circuit for example, can include a plurality of control switches 131, a plurality of current sources 132, an NMOS switch 133 and a comparator 134. Each the current source 132 is electrically coupled with the corresponding control switch 131, and is also electrically coupled with the plurality of operation touch pads 11, the reference touch pad 12 and the comparator 134. The comparator 134 is further electrically coupled with each of the control switches 131 and the NMOS switches 133.

The statistics module 14 is electrically coupled with the power supply module 13, particularly electrically coupled with the comparator 134 in this embodiment, and includes a counter 141, a timer 1421 and a register 143. The counter 141 is electrically coupled with the comparator 134. The timer 142, electrically coupled with the counter 141, is consisted of a plurality of T-flip flops. The register 143, electrically coupled with the timer 142, is consisted of a plurality of D-flip flops.

The power supply module 13 is to energize the reference touch pad 12 repeatedly by a reference supply duty in a reference measurement mode. The reference supply duty includes a reference supply stage and a reference supply-terminated stage. Upon such an arrangement, if the reference touch pad 12 is in a reference supply stage, then it would be charged from an initial voltage value to a set voltage value. On the other hand, if the reference touch pad 12 is in a reference supply-terminated stage, then it would be discharged from the set voltage value back to the initial voltage value.

By having the preferred embodiment of the present invention as a typical example, while in the reference supply stage, the control switch 131 labeled in the figure would be conducted to the current source 132 labeled in the figure so as to energize the reference touch pad 12 by charging a capacitor of the reference touch pad 12. After a voltage of the reference touch pad 12 reaches the set voltage value preset by the comparator 134, the comparator 134 would send a comparison signal S1 to the control switch 131 and the NMOS switch 133 labeled in the figure, so that the control switch 131 would be closed and further to energize the NMOS switch 133. Thereby, the reference touch pad 12 would enter the reference supply-terminated stage so as to have the NMOS switch 133 to discharge from the set voltage value back to the initial voltage value (0V for example). In the present invention, the operational definition of the term "repeatedly energize" is directed to the charging/discharging cycle of the reference touch pad 12 from the initial voltage value to the set voltage value, and then back to the initial voltage value.

In addition, in a calibration mode, the power supply module 13 is further to repeatedly energize one of the plurality of operation touch pads 11 by a calibration supply duty. The calibration supply duty includes a calibration supply stage and a calibration supply-terminated stage. In the calibration supply stage, the one of the operation touch pads 11 is charged from the initial voltage value to the set voltage value. On the other hand, in the calibration supply-terminated stage, the one of the operation touch pads 11 is discharged from the set voltage value back to the initial voltage value. Similarly, the energizing pattern upon the operation touch pad 11 and that upon the reference touch pad 12 are the same, and thus details thereabout would be omitted herein.

The statistics module 14 preset with a reference charging number (50 for example) is to, in the reference measurement mode, compute the reference charging time (10 ms for example) when the accumulated number of the reference supply duty reaches the reference charging number. Practically, the counter 141 is preset with the aforesaid reference charging number. While in the reference measurement mode, the counter 141 issues a reference counting signal S2 as soon as the accumulated number of the reference supply duty reaches the reference charging number (for example, 50 supply duties). Preferably, the number can be accumulated by counting the number of the comparison signal S1 issued by the comparator 134.

Upon the timer 142 receives the reference counting signal S2, the reference charging time is computed, and a clock signal S3 standing for the corresponding reference charging time is transmitted. The register 143 is then to receive the clock signal S3, and further to store the reference charging time.

In the present invention, the difference between the larger capacitor and the smaller capacitor is that, while in charging, the larger capacitor needs a bigger duty (i.e. a longer charging time). Hence, the reference supply duty is larger than the calibration supply duty. While in the calibration mode, the statistics module 14 is to count the number of the calibration supply duties experienced during the reference charging time (the counting can be to count the number of the comparison signals S1 transmitted from the comparator 134), and thereby to define a reference charged number for each of the operation touch pads 11 in the reference charging time.

Practically, while in the calibration mode, the timer 142 is to read the reference charging time stored in the register 143 (namely, to forward the reference charging time stored in the register 143 to the timer 142), and thereby triggers the counter 141 to count the number of the calibration supply duty within the reference charging time, such that the reference charged number only can be defined as the number of the calibration supply duty within the reference charging time.

It shall be noted that, after the reference charged number is obtained, the reference charged number can be used to determine whether or not the operation touch pad 11 is touched by the user. For example, if the reference charged number for each of the operation touch pads 11 is 100, while in touching control by the user, the capacitor for the operation touch pad 11 would become larger. Hence, in the same reference charging time, the number counted would become smaller (80 for example). In practice, the user may base on the reference charged number to configure an error percentage (5% for example, i.e. 5 times). Thus, in this embodiment, a valid touch is determined if the reference charged number is out of the 5% error percentage; and, on the other hand, a non-touch is determined if the reference charged number is within the 5% error percentage.

In addition, the user can adjust the capacitance value of the reference pad 12 according to environmental conditions, or adjust the reference charging number through the reference touch pad 12. Thereupon, the reference charged number can be changed by varying the reference charging time. For example, a capacitor can be electrically coupled with the reference touch pad 12, such that the reference charging time can be adjusted by altering the capacitance value of the reference touch pad 12. Alternatively, a resistor (grounded or electrically coupled with a voltage source) can be electrically coupled with the reference touch pad 12, so that the reference charging time can be adjusted by changing the set voltage value. Further alternatively, a clock-pulse input circuit can be electrically coupled with the reference touch pad 12, so that the reference charging time (and further the reference charging number) can be directly adjusted according to the clock-pulse signal of the clock-pulse input circuit. Thus, no matter that the capacitor, the resistor or the clock-pulse input circuit is applied, the reference charging time can be varied so as to detect the range of the calibration supply duty.

Figure 4:
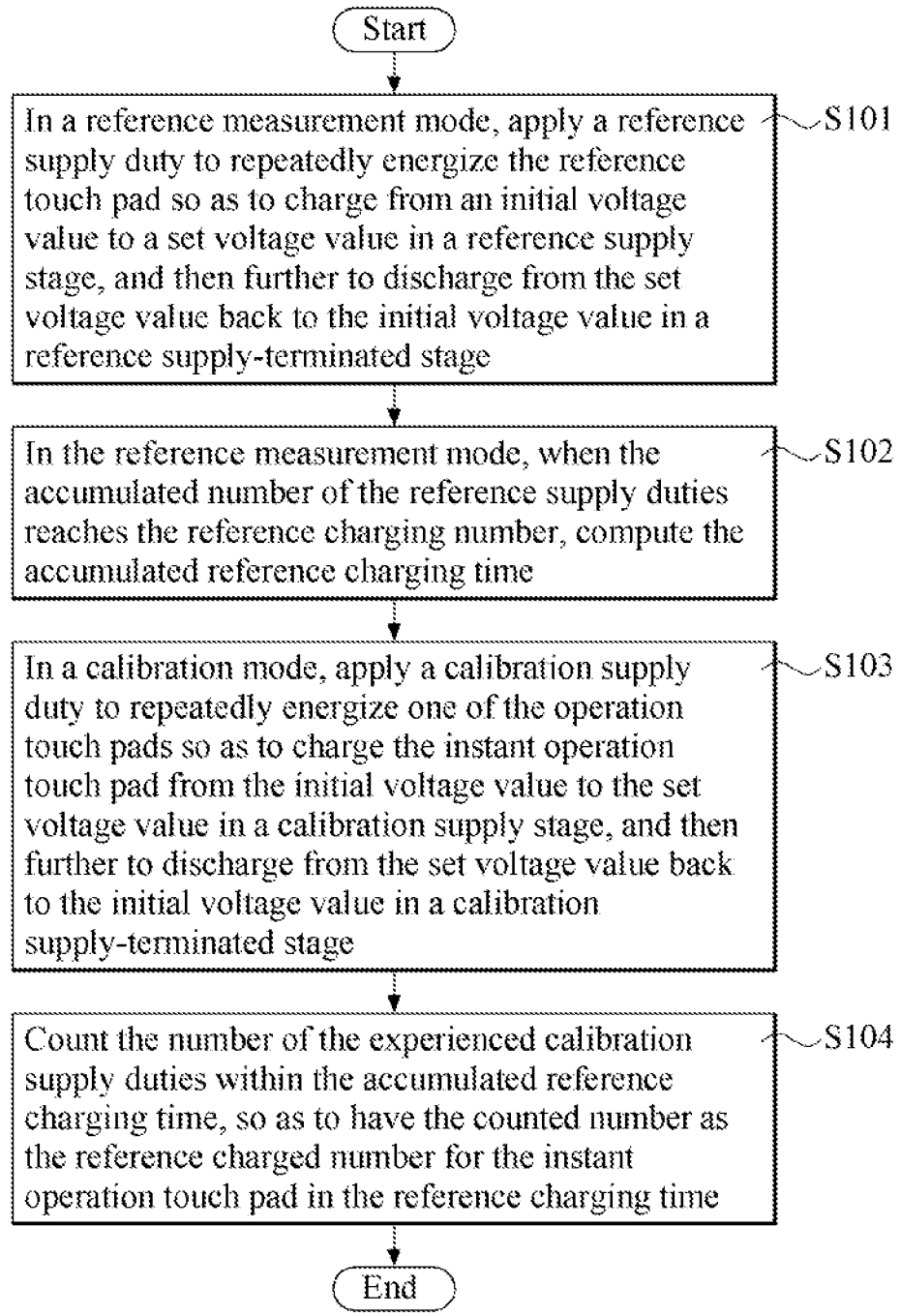
FIG. 4 is a schematic flowchart of a preferred charging calibration method for the preferred touch pad in accordance with the present invention.

Refer now to FIG. 1 through FIG. 4, where FIG. 4 is a schematic flowchart of a preferred charging calibration method for the preferred touch pad in accordance with the present invention. As shown, the preferred charging calibration method applicable to one of the touch pads of the aforesaid charging calibration system 1 includes the following steps.

Step S101: In a reference measurement mode, apply the reference supply duty to repeatedly energize the reference touch pad so as to charge from the initial voltage value to the set voltage value in a reference supply stage, and then further to discharge from the set voltage value back to the initial voltage value in a reference supply-terminated stage. Namely, the reference supply duty includes the reference supply stage and the reference supply-terminated stage.

Step S102: In the reference measurement mode, when the accumulated number of the reference supply duty reaches the reference charging number, compute the reference charging time.

Step S103: In a calibration mode, apply a calibration supply duty to repeatedly energize one of the operation touch pads 11 so as to charge the instant operation touch pad from the initial voltage value to the set voltage value in a calibration supply stage, and then further to discharge from the set voltage value back to the initial voltage value in a calibration supply-terminated stage. Namely, the calibration supply duty includes the calibration supply stage and the calibration supply-terminated stage.

Step S104: Count the number of the experienced calibration supply duty within the reference charging time, so as to have the counted number as the reference charged number for the instant operation touch pad in the reference charging time.

Practically, the reference supply duty is greater than the calibration supply duty. In Step S102, the reference charging time can be further stored into the corresponding register 143. In Step S103, the reference charging time stored in the register 143 can be forwarded to the timer 142 for a synchronization purpose. In Step S104, the reference charging time can be further read for counting the calibration supply duties within the reference charging time. In addition, operations in Step S101 through Step S104 are identical to those in the aforesaid charging calibration system 1 of a touch pad described above, and thus details thereabout are omitted herein.

In summary, by adopting the charging calibration system and the method thereof in accordance with the present invention, since the reference charging time is obtained by applying the reference charging number to energize the reference touch pad in the reference measurement mode, and then the number of the operation touch pads can be related to the reference charging time. Hence, under different environments, sensitivity of the operation touch pad can be adjusted directly by varying the capacitance value of the reference touch pad.

While the present invention has been particularly shown and described with reference to a preferred embodiment, it will be understood by those skilled in the art that various changes in form and detail may be without departing from the spirit and scope of the present invention.

What is claimed is:

1. A charging calibration system of a touch pad, comprising:
    a plurality of operation touch pads, having a first capacitance value;
    a reference touch pad, having a second capacitance value greater than the first capacitance value;
    a power supply module, electrically coupled with the plurality of operation touch pads and the reference touch pad; in a reference measurement mode, applying a reference supply duty including a reference supply stage and a reference supply-terminated stage to repeatedly energize the reference touch pad so as to charge from an initial voltage value to a set voltage value in the reference supply stage, and then further to discharge from the set voltage value back to the initial voltage value in the reference supply-terminated stage; in a calibration mode, applying a calibration supply duty including a calibration supply stage and a calibration supply-terminated stage to repeatedly energize one of the operation touch pads so as to charge the instant operation touch pad from the initial voltage value to the set voltage value in the calibration supply stage, and then further to discharge from the set voltage value back to the initial voltage value in the calibration supply-terminated stage; and
    a statistics module, electrically coupled with the power supply module, having a reference charging number; in a reference measurement mode, when an accumulated number of the reference supply duty reaches the reference charging number, computing the reference charging time;
    wherein, the reference supply duty is greater than the calibration supply duty, and, in the calibration mode, the statistics module counts a number of the experienced calibration supply duty within the reference charging time so as to have the counted number as the reference charged number for the instant operation touch pad in the reference charging time.

2. The charging calibration system of a touch pad of claim 1, wherein the statistics module includes:
    a counter, having the reference charging number, electrically coupled with the power supply module, being to issue a reference counting signal when the accumulated number of the reference supply duty reaches the reference charging number in the reference measurement mode;
    a timer, electrically coupled with the counter, being to calculate the reference charging time upon receiving the reference counting signal, and to transmit a clock signal standing for the reference charging time; and
    a register, electrically coupled with the timer, being to receive the clock signal so as to store the reference charging time;
    wherein, in the calibration mode, the timer reads the reference charging time, and the counter is triggered to count the number of the experienced calibration supply duties within the reference charging time so as to have the counted number as the reference charged number.

3. The charging calibration system of a touch pad of claim 2, wherein the timer is consisted of a plurality of T-flip flops.

4. The charging calibration system of a touch pad of claim 2, wherein the register is consisted of a plurality of D-flip flops.

5. A charging calibration method of a touch pad, applicable to the charging calibration system of a touch pad of claim 1, comprising the steps of:
    (a) in the reference measurement mode, applying the reference supply duty to repeatedly energize the reference touch pad so as to charge from the initial voltage value to the set voltage value in the reference supply stage, and then further to discharge from the set voltage value back to the initial voltage value in the reference supply-terminated stage;
    (b) in the reference measurement mode, when the accumulated number of the reference supply duty reaches the reference charging number, computing the reference charging time;
    (c) in the calibration mode, applying the calibration supply duty to repeatedly energize one of the operation touch pads so as to charge the instant operation touch pad from the initial voltage value to the set voltage value in the calibration supply stage, and then further to discharge from the set voltage value back to the initial voltage value in the calibration supply-terminated stage; and
    (d) counting the number of the experienced calibration supply duty within the reference charging time, so as to have the counted number as the reference charged number for the instant operation touch pad in the reference charging time;
    wherein the reference supply duty is greater than the calibration supply duty.

* * * * *